J. C. Brown,

Making Match Splints.

No. 2,071. Reissued Sep. 12, 1865.

Witnesses:
Amelia A. Verrell.
Rufus Sanford.

Inventor:
J. C. Brown.
by his Atty
John E. Earle

AM. PHOTO-LITHO. CO. N.Y. (OSBORNE'S PROCESS)

UNITED STATES PATENT OFFICE.

JONATHAN C. BROWN, OF BROOKLYN, NEW YORK.

IMPROVEMENT IN MACHINES FOR CUTTING SPLINTS.

Specification forming part of Letters Patent No. 43,177, dated June 21, 1864; Reissue No. 2,071, dated September 12, 1865.

*To all whom it may concern:*

Be it known that I, J. C. BROWN, of Brooklyn, in the county of Kings and State of New York, have invented a new and useful Improvement in Machines for Cutting Splints; and I do hereby declare the following to be a full, clear, and exact description of the same, when taken in connection with the accompanying drawings and the letters of reference marked thereon, and which said drawings constitute part of this specification, and represent, in—

Figure 1:
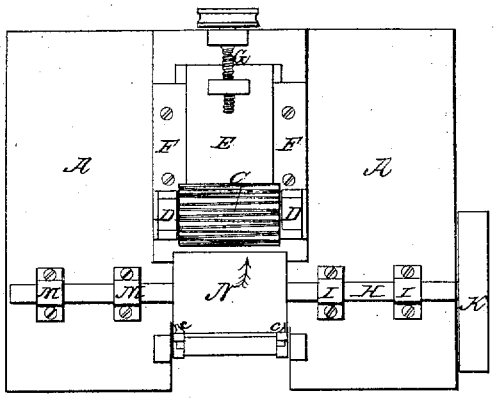
Figure 2:
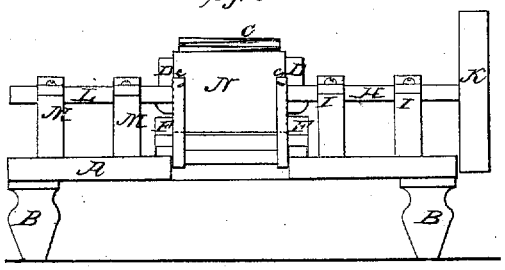

Figure 1, a plan or top view; Fig. 2, a front side view; and in Fig. 3 a cross-section.

Similar letters and characters indicate like parts.

My invention relates to an improvement in machines for cutting tooth-picks, match-splints, &c.; and it consists in a series of knives fixed upon the surface of a cylinder and arranged in combination with a mechanical contrivance for revolving a block of wood, against which the said knives are pressed with sufficient force to cut the surface of the said block (revolving) into narrow splints, and combining therewith a cutter to shave the splints f om the block.

To enable others skilled in the art to construct and use my invention, I will proceed to describe the same as illustrated in the accompanying drawings.

A is the bed-plate, supported upon legs B B.

Figure 3:
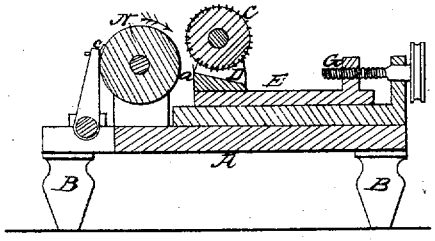

C is a cylinder, having cutters set on its surface, as seen in Fig. 3. The said cylinder is supported and revolves freely in bearings D D, which rest upon or are a part of a slide, E. The said slide is moved in guides F by a screw, G.

*a* is a cutter or shave, also fixed to and moves with the said slide E.

H is a mandrel, supported and revolving in bearings I I, and is driven by power being applied to the pulley K fixed thereon.

L is a similar mandrel, supported and revolving in bearings M M.

Between the two mandrels H and L, I place a sound block of wood, N, which is held by and revolves with the said mandrels.

Force the cutter against the block of wood N so that the cutters will enter the block of wood to the proper depth, then apply power to the pulley K to cause the block to revolve in the direction denoted by arrows against the cutters. This causes the cylinder to revolve and cut the surface of the block into narrow strips, after which the block comes in contact with the knife *a*, which shaves the splints from the block. As the block continues to revolve and be cut from, the cutters are constantly kept up against the block by means of the screw G, which may be turned by hand or by connection with the other parts of the machine.

For cutting match-splints the cutters should all be parallel and at an equal distance apart.

For tooth-picks it is desirable that one end should be pointed. For this purpose I place the cutters diagonally on the cylinder, so that the points are formed alternately at opposite ends of the cylinder, as seen in Fig. 1. I bevel the points by means of the cutters *c c*, one at each end of the block, set so as to shave off the corner.

I prefer to steam the wood before cutting, in order to soften it.

Having fully described my invention, what I claim as new and useful, and desire to secure by Letters Patent, is—

1. I do not broadly claim setting cutters diagonally on the surface of a cylinder, as such device is well known and in general use in hay-cutters; but I do claim the cutter-cylinder C—when the cutters are placed diagonally thereon, in the manner described, so that the angle of each cutter, relatively to the axis of the cylinder, shall be opposite to the next cutter and alternate cutters parallel with each other, whereby the cylinder, revolving as described, will cut the splints tapering, substantially as and for the purpose specified.

2. The cutter-cylinder C and the fixed cutter *a*, when combined and arranged substantially as and for the purpose described.

JONATHAN C. BROWN.

Witnesses:
R. A. LINDSAY,
JOHN E. EARLE.